US006765191B2

(12) United States Patent
Hollis et al.

(10) Patent No.: US 6,765,191 B2
(45) Date of Patent: Jul. 20, 2004

(54) ROLLER SWITCH

(75) Inventors: Brian Darrell Hollis, Wadsworth, OH (US); Robert Albert Lammlein, Jr., Cuyahoga Falls, OH (US); Thomas Alan Murray, Copley, OH (US); Raymond Patrick Eckman, Stow, OH (US); William George Burton, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 61 days.

(21) Appl. No.: 09/933,416

(22) Filed: Aug. 20, 2001

(65) Prior Publication Data

US 2003/0034440 A1 Feb. 20, 2003

(51) Int. Cl.⁷ .............................. G06M 7/00; H01J 40/14
(52) U.S. Cl. ........................................ 250/221; 356/634
(58) Field of Search .............................. 250/221, 221.1, 250/223 R, 559.26, 559.24, 559.36; 356/634, 637, 429, 619, 639, 627, 628; 200/61.42, 61.17, 61.18, 61.83

(56) References Cited

U.S. PATENT DOCUMENTS

| 3,264,559 A | 8/1966 | Eppler ........................ 324/69 |
| 3,621,266 A | 11/1971 | Akuta ........................ 250/219 |
| 3,653,770 A | 4/1972 | Yamamuro .................. 356/160 |
| 3,728,181 A | 4/1973 | Simmons, Jr. ............... 156/96 |
| 3,874,974 A | 4/1975 | Simmons, Jr. ............... 156/405 |
| 3,887,806 A | 6/1975 | Rodak et al. ........... 250/223 B |
| 4,088,411 A | 5/1978 | Ahlquist et al. ............. 356/167 |
| 4,273,447 A | 6/1981 | Nelle ......................... 356/373 |
| 4,576,287 A * | 3/1986 | Bingham et al. ........... 209/601 |
| 4,777,729 A | 10/1988 | Hausler ..................... 33/147 L |
| 5,412,521 A * | 5/1995 | Dalziel ........................ 360/92 |
| 5,427,636 A | 6/1995 | Chabin et al. ................ 156/64 |
| 5,435,543 A | 7/1995 | Lehmann ............... 271/258.04 |
| 5,469,262 A | 11/1995 | Keen et al. ................. 356/386 |
| 5,699,161 A | 12/1997 | Woodworth ................ 356/379 |
| 5,711,649 A * | 1/1998 | Gerlier ..................... 414/790.7 |
| 5,900,639 A * | 5/1999 | Peters ..................... 250/559.4 |
| 5,936,398 A | 8/1999 | Bellefeuille ................. 324/206 |
| 5,959,272 A | 9/1999 | Marchitto ................ 200/61.42 |
| 6,052,192 A | 4/2000 | Harris et al. ................ 356/383 |

FOREIGN PATENT DOCUMENTS

| DE | 2105765 | 8/1972 | .......... B29H/17/36 |
| GB | 2090234 | 7/1982 | .......... B29H/17/20 |
| JP | 55116208 | 9/1980 | .......... G01B/11/04 |
| JP | 59075106 | 4/1984 | .......... G01B/11/04 |
| JP | 61255840 | 11/1986 | .......... B29D/30/46 |
| JP | 1118434 | 5/1989 | .......... B29D/30/30 |
| JP | 5084849 | 4/1993 | .......... B29D/30/30 |
| JP | 6323817 | 11/1994 | .......... G01B/11/04 |
| WO | 8101827 | 7/1981 | ............ B65H/7/14 |

* cited by examiner

Primary Examiner—Thanh X. Luu
Assistant Examiner—Seung C Sohn
(74) Attorney, Agent, or Firm—Nancy T. Krawczyk

(57) ABSTRACT

The disclosed roller switch has a roller, a flag arm, and a photoelectric detector. The roller is connected to the flag arm and vertical movement of the roller causes the flag arm to move. The movement of the flag arm causes the photoelectric detector to send a signal. The signal may be used to measure the length of a material passing under the roller. The inventive roller switch has a pair of flag arms, and the roller is mounted on a shaft extending between the pair of flag arms. By providing a pair of flag arms connected by the roller, the roller switch is more robust and durable. The roller switch is also capable of pivoting across a conveyor belt.

11 Claims, 4 Drawing Sheets

ROLLER SWITCH

FIELD OF THE INVENTION

The present invention is directed to a roller switch. Specifically, the invention is directed to a roller switch for sensing the leading edge of a material on a conveyor belt, which triggers a sensor to determine the length of the material on the conveyor belt.

BACKGROUND OF THE INVENTION

In tire manufacturing, stock material of various types is applied to a building drum. The stock materials are cut to a required length. The cutting of the stock material occurs either at the building drum, or prior to arriving at the building drum. If the stock material is cut at the building drum, the strip length is determined by the tire builder or by a sensor. If the stock material is to be cut automatically, to reduce waste, the length of the stock must be accurately measured.

One method of measuring stock material is the roller switch illustrated in FIG 4. The roller switch, mounted along the side of a conveyor belt carrying the stock material, has a mounting bracket 102, a sensor bracket 104, a roller 106, and a flag arm 108. The roller 106, which extends only a partial distance across the conveyor, is related to the flag arm 108 and the related roller 106 and arm 108 pivot about a shaft 110. The flag arm 108 is formed of a lightweight material and is spring biased to maintain its position when the switch is not in operation. The side 112 of the flag arm 108 that is adjacent to a photoeye mounted within the sensor bracket 104 is covered in a reflective tape.

At the illustrated rest, or non-sensing, position, the flag arm 108 is not directly adjacent to the photoeye. When material travels under the roller 106, the roller 106 is pushed up, and due to the connection between the roller 106 and the flag arm 108, the flag arm 108 moves and the side of the arm 112 covered in reflective tape is then positioned adjacent to the photoeye. Due to the reflective taping on the flag arm 112, light is directed back to the photoeye and a sensor is triggered to indicate that material is now traveling under the roller 106 and measurement of the length of the material is taken.

While this roller switch has been sufficient, it has not proven to be reliable for extended periods of time due to the following problems. The photoeye is triggered by reflective tape; however, the tape can quickly become dirty and thus unreliable, requiring down time to clean the switch. The unit is also susceptible to being knocked out of adjustment. This can occur if the material traveling on the conveyor gets bunched up or is too thick and hits the roller 106. Additionally, if the thickness of the material is too great, the flag arm 112 may travel past the photoeye, providing an incorrect indication. Also, the switch is easily knock out of adjustment during the removal of stock. Stock is frequently removed from the conveyor for a variety of reasons.

SUMMARY OF THE INVENTION

The present invention is designed to overcome the limitations of the known mechanism. The roller switch is more robust than the known conventional roller switches.

The disclosed roller switch has a roller, a flag arm, and a photoelectric detector. The roller is connected to the flag arm and vertical movement of the roller causes the flag arm to move. The movement of the flag arm causes the photoelectric detector to send a signal. The signal may be used to measure the length of a material passing under the roller. The inventive roller switch has a pair of flag arms, and the roller is mounted on a shaft extending between the pair of flag arms. By providing a pair of flag arms connected by the roller, the roller switch is more robust and durable.

In one aspect of the invention, to further increase the robust character of the roller switch, a tube extending between the flag arms is located adjacent to the roller. When material passes under the roller switch, the material must first pass under the tube.

In another aspect of the invention, the vertical movement of the roller cause the upper end of the flag arm to unblock the photoelectric detector.

In another aspect of the roller switch, the roller switch is capable of pivoting about one end when mounted onto a support structure. Pivoting of the entire unit allows for easier servicing of the roller switch and makes it easier to remove any material from beneath the roller switch.

In another aspect of the roller switch, each flag arm is attached to an end plate. The first end plate is attached to pivoting means and the second end plate is attached to locking tube into which a locking pin is inserted. The roller switch pivots about the first end plate when the locking pin is removed from the tube.

Also disclosed is a method of measuring the length of a finite length strip material. The method includes the steps of placing the material on a moving conveyor belt, passing the material under a roller, causing the roller to vertically move, pivoting a flag arm in response to the movement of the roller, generating a signal in response to the movement of the flag arm, and measuring the length of the material. In the inventive method disclosed, the material passed under a tube prior to passing under the roller and the flag arm pivots about a shaft extending through the tube.

BRIEF DESCRIPTION OF THE DRAWINGS

The invention will be described by way of example and with reference to the accompanying drawings in which.

DETAILED DESCRIPTION OF THE INVENTION

Figure 1:
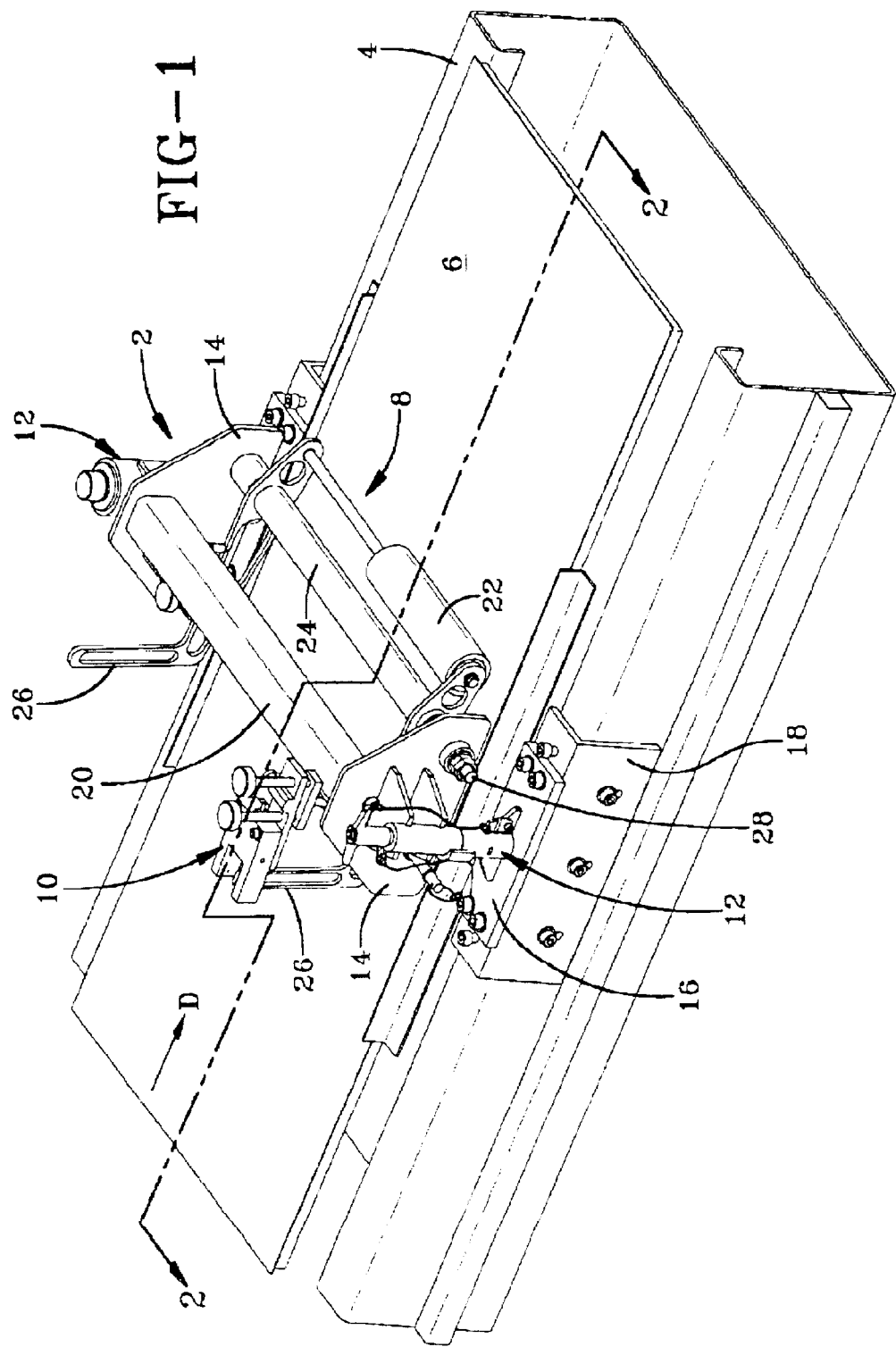
FIG. 1 is a perspective view of the roller switch.

FIG. 1 illustrates the roller switch 2 of the present invention. The roller switch 2 is mounted on railings 4 astride a conveyor belt 6. The roller switch 2 has a roller assembly 8, a photoelectric switch 10, and a pivot assembly 12. The roller assembly 8 extends between two end plates 14 mounted on support plates 16. The support plates 16 are secured to angle brackets 18 that are attached to the railings 4. Extending between the end plates 14 is a support beam 20.

The roller assembly 8 has a roller 22, a protective tube 24, and side flag arms 26. The roller assembly 8 pivots on a pivot shaft 28 that extends through the protective tube 24. The roller 22 is mounted in a rotatable manner on a roller shaft 30. The roller shaft 30 and the protective tube 24 are secured to the side flag arms 26. The protective tube 24 may extend beyond the flag arms 26. The pivot shaft 28 extends beyond the flag arms 26 and attaches to the end plates 14 to permit the roller assembly 8 to pivot.

Figure 2:
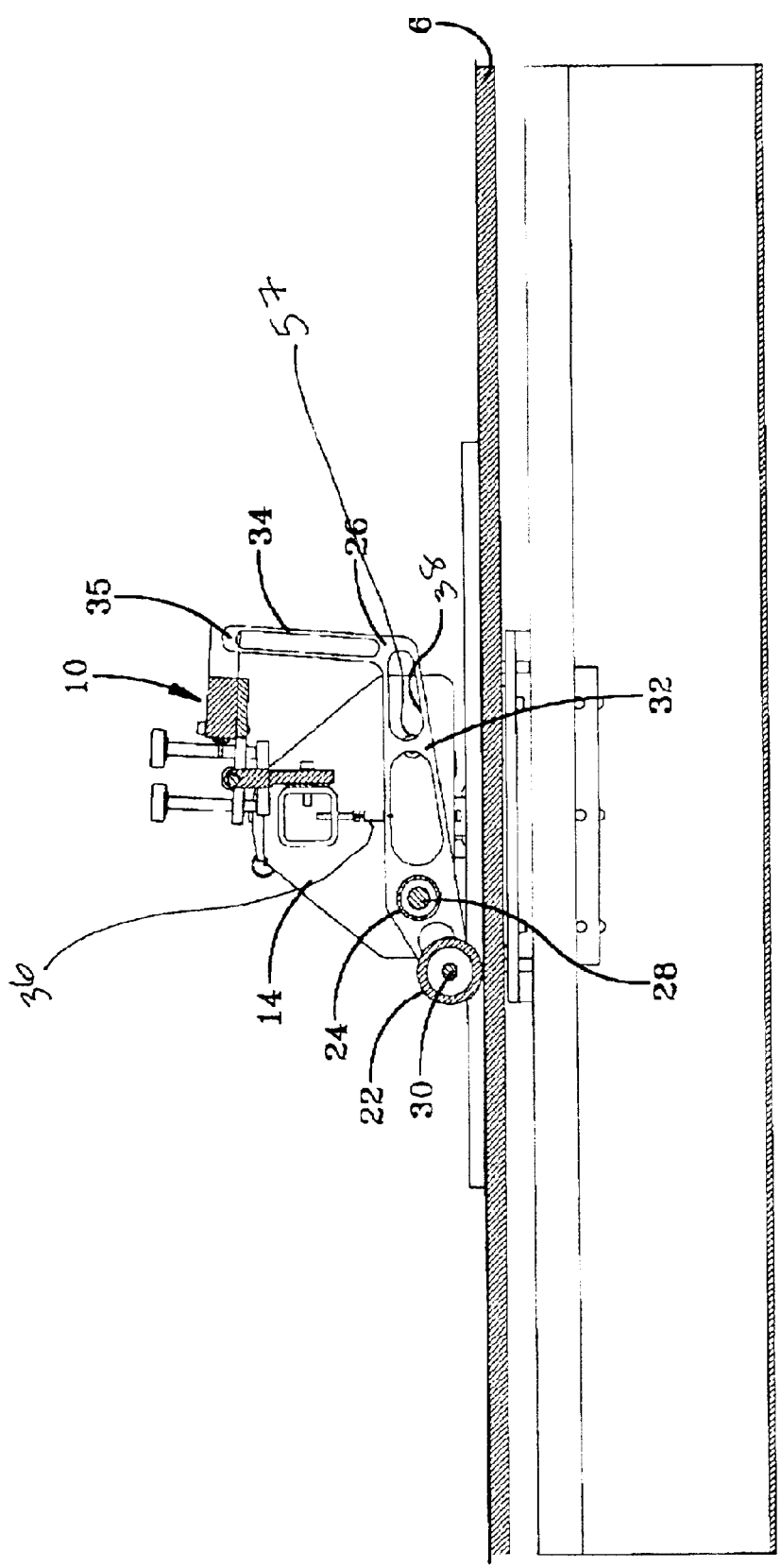
FIG. 2 is a cross sectional view of the roller assembly.

As seen in FIG. 2, each flag arm 26 has a horizontal leg 32 and a vertical leg 34. The roller shaft 30 and the protective tube 24 are secured at one end of the horizontal leg 32. Midway along the horizontal leg 32 is an adjustable spring 36 to tension and maintain the position of the roller assembly 8. The vertical leg 34 extends at approximately ninety degrees from the horizontal leg 32. Along both legs 32, 34, cut outs 38 reduce the weight of the arms 26. The size and configuration of the cut outs 38 are selected to reduce the weight while maintaining the structural integrity of the arms 26. Whatever the placement of the cut outs 38, the uppermost end 35 of the vertical leg 34 remains solid.

Figure 3:
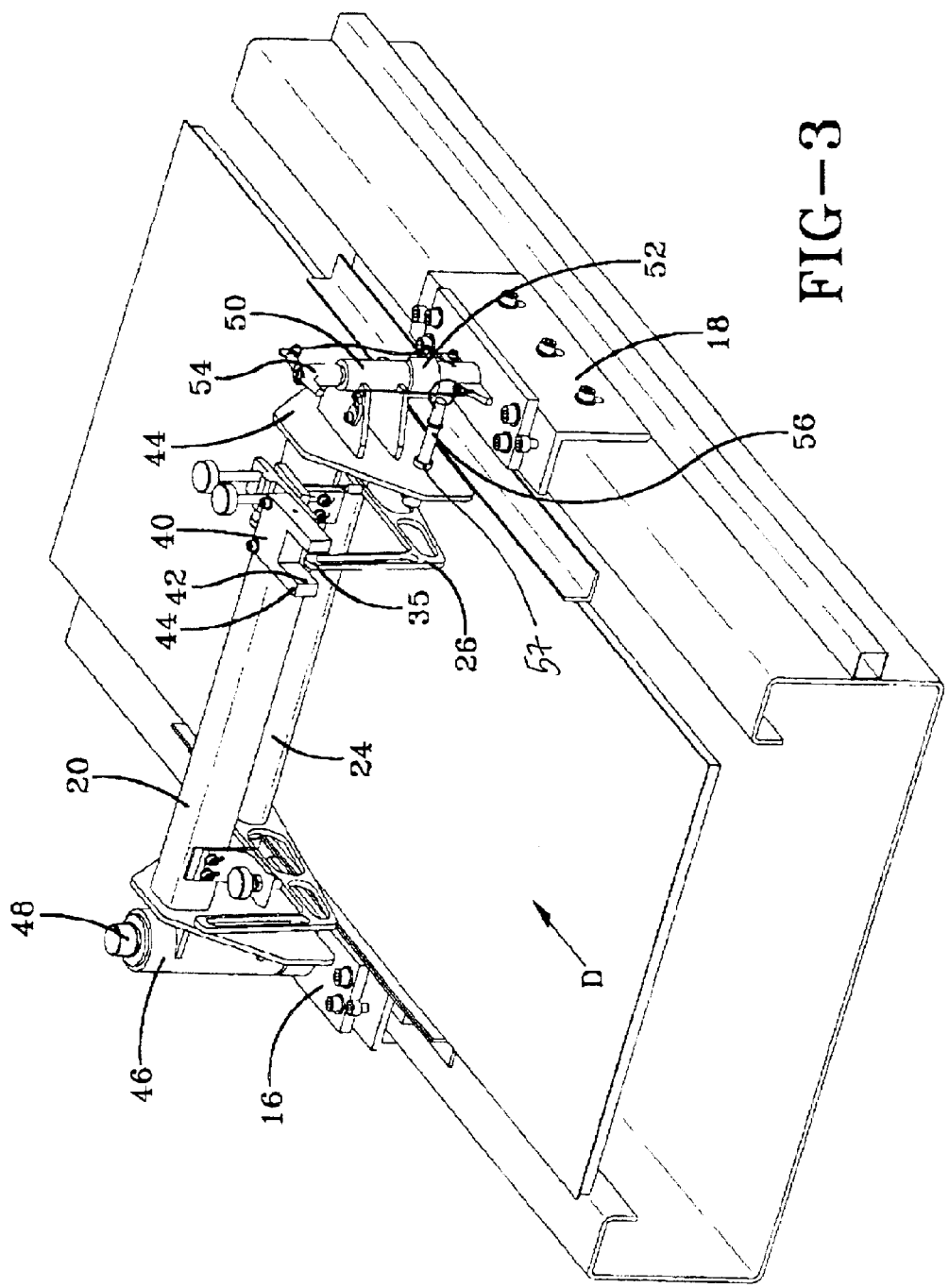
FIG. 3 is a perspective view of the roller switch from a different view.
Figure 4:
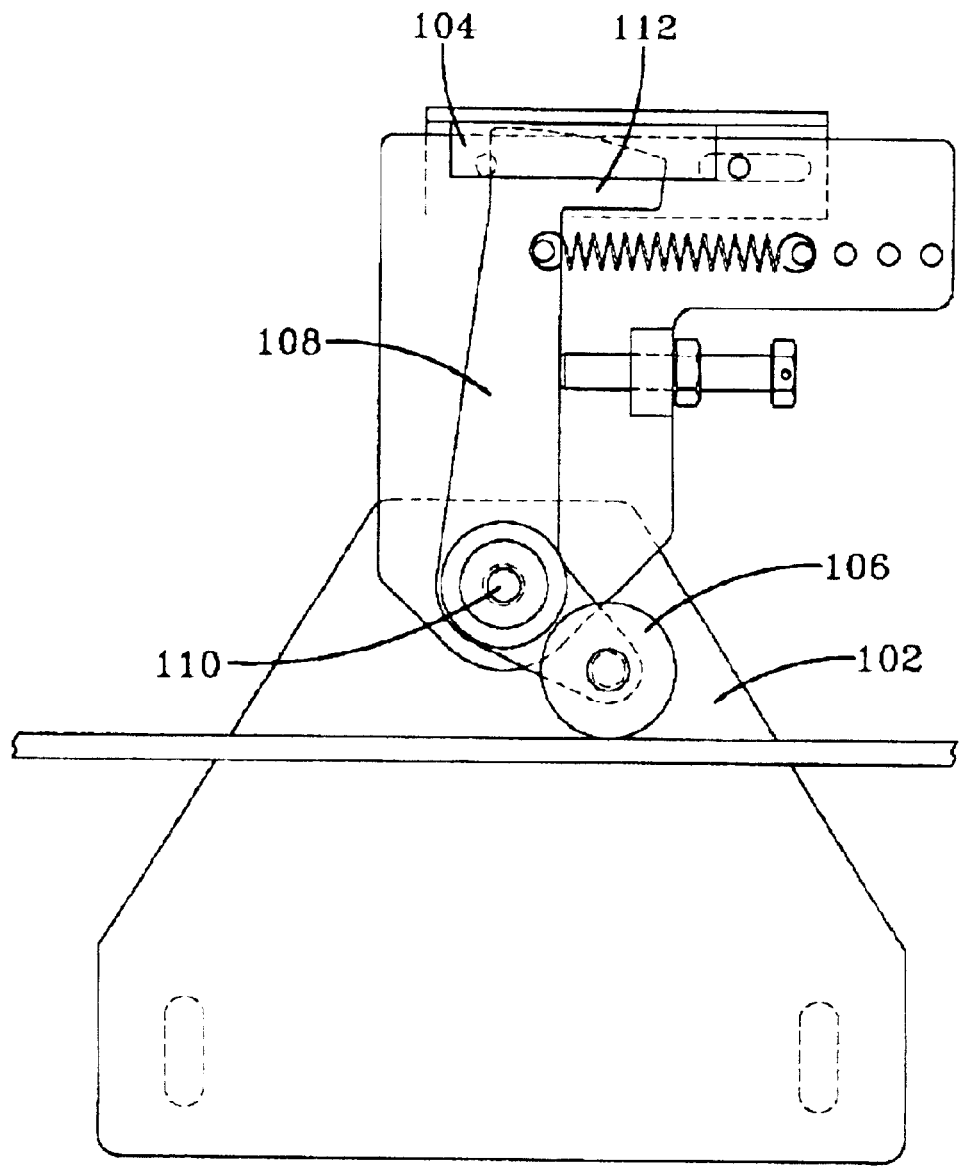
FIG. 4 is a cross sectional view of a prior art switch.

Mounted on one end of the support beam 20 is a photoeye bracket 40, see FIG. 3. A photoeye emitter 42 is mounted within in one leg 44 of the bracket 40 and a corresponding receiver is mounted within the opposing leg 44. The photoeye bracket 40 is positioned so the vertical leg 34 of the flag arm 26 is midway between the bracket legs 44. The photoeye bracket 40 may be mounted at either end of the beam 20.

Stock travels on the conveyor belt 6 in the direction shown by the arrow D. The stock passes under the protective tube 24, and then contacts the roller 22. If the stock is not moving smoothly along on the conveyor belt 6, but is instead bundled up or traveling as a mass instead of a sheet, the stock will hit the protective tube 24 first, instead of the roller 22.

As the stock passed under the roller 22, the roller 22 is vertically raised, causing the roller assembly 8 to pivot about the pivot shaft 28. As the one end of the horizontal leg 32 is raised, the other end of the leg 32 is lower, pulling the vertical leg 34 of the flag arm 26 down and the uppermost end 35 of the vertical leg 34 out of alignment with the photoeye 42. Thus, when there is no stock passing under the roller 22, the photoeye 42 is blocked, and when there is stock passing under the roller 22, the photoeye 42 is not blocked. Because the vertical leg 34 of the flag arm 26 is pulled down due to the pivoting motion of the roller assembly 8, regardless of the thickness of the stock passing under the roller 22, the flag arm 26 will not inadvertently block the photoeye 42, sending an incorrect signal. When the photoeye 42 is tripped by the movement of the flag arm 26, a signal is sent to a measuring device (not illustrated), and measurement of the length of the material moving along the conveyor belt 6 begins.

The roller assembly 8 is adjusted and tensioned so that when there is no stock on the conveyor belt 6 passing under the roller 22, the roller 22 is spaced above the surface of the conveyor belt 6. The spacing between the roller 22 and the surface of the conveyor belt 6 is selected to be less than the thickness of the stock, including any thickness tolerances, that will travel under the roller 22. The spacing must also be sufficient to permit the end 35 of the vertical leg 34 of the flag arm 26 to move out of alignment with the photoeye 42 when stock passes under the roller 22. For a stock thickness of 2 to 3 mm, a preferred spacing between the roller 22 and the surface of the conveyor belt 6 is about 0.5 mm.

The roller 22 is illustrated as having a length of about one half the length of the roller shaft 30. However, the roller 22 may have any length equal or less than the roller shaft 30. The roller 22 may also be mounted on the other end of the roller shaft 30 than that which is illustrated, or may be mounted in a central position on the shaft. The primary requirement for the roller position is that the roller 22 be in a location that permits the leading edge of the stock to contact the roller 22.

The pivot assembly 12 permits the roller switch 2 to be swung to one side of the conveyor belt 6. On the pivoting side of the roller switch 2, the end plate 14 is attached to a support sleeve 46. Inside the sleeve 46 is a bearing sleeve 48 about which the support sleeve 46 rotates.

On the locking side of the switch 2, a vertical sleeve 50 is attached to the other end plate 14. Extending upwardly from the associated support plate 16 is a sleeve 52. When the support plate sleeve 52 is aligned with the vertical sleeve 50, a ball locking pin 54 is inserted therein to prevent movement of the roller switch 2.

Located adjacent to the sleeves 50, 52 is a raising pin 56. The pin 56 is inserted into a hole 57 within the end plate 14 and extends through the other side of the plate 14. The pin 56 extends out from the end plate 14 at a height less than the height of the support plate sleeve 52. During normal operation of the roller switch 2, the pin 56 is inserted into the end plate 14 to a depth such that the pin 56 does not interfere with the arm 26, see also FIG. 2. When the roller switch 2 is to be pivoted, the roller 22 is manually raised, and the pin 56 is pushed further in. The pin 56 is pushed in to a depth so that the pin is under the horizontal arm 32 and the arm 32 rests on the pin 56, thus moving the roller 22 out of the way during pivoting and any maintenance of the switch 2. Also, the depth should be such that the end of the pin 56 will pass by the sleeve 52 when the roller switch 2 is pivoted. Should the pin 54 not be pushed in, as the roller switch 2 begins to swing, the pin 56 will contact the support plate sleeve 52, stopping movement of the roller switch 2.

The selection of which side of the roller switch 2 is the locking side and which is the pivoting side is arbitrary and is best determined by ease of operation. The roller switch 2 may be pivoted to one side of the conveyor belt 6 for various reasons such as removal of stock from the conveyor belt 6, adjusting the tension of the roller assembly 8, or routine maintenance of the switch 2.

By providing the roller switch 2 with support at both ends, as opposed to the cantilever design of the conventional roller switch 100, the switch 2 is more robust and less susceptible to damage. Furthermore, by extending the roller shaft 30 across the full width of the conveyor belt 6, the length and the position of the sensing roller 22 may be readily altered for any material width or configuration of material carried on the conveyor belt 6, such as material with a taped leading edge or adjacent lengths of material.

Also, by reversing the conventional method of tripping the photoeye 42, greater accuracy and less false trips in the detection of material beneath the roller switch 2 is achieved.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full-intended scope of the invention as defined by the following appended claims.

What is claimed is:

1. A roller switch comprising a roller, a pair of identical flag arms, and a photoelectric detector, wherein the roller is connected to the identical flag arms and vertical movement of the roller causes the flag arms to move, and movement of one of the flag arms causes the photoelectric detector to send a signal, the roller being mounted on a shaft that extends between the pair of identical flag arms, and wherein the photoelectric detector is mounted on a support beam parallel to the roller shaft and is capable of being mounted on either end of the support beam.

2. A roller switch in accordance with claim 1 wherein adjacent to the roller shaft is a tube that extends between both flag arms.

3. A roller switch in accordance with claim 1 wherein vertical movement of the roller causes at least one flag arm to unblock the photoelectric detector.

4. A roller switch in accordance with claim 1 wherein the roller switch is capable of pivoting about one end when mounted onto a support structure.

5. A roller switch in accordance with claim 4 wherein the roller and the flag arms are capable of being fixedly raised prior to pivoting of the roller switch.

6. A roller switch in accordance with claim 1 wherein each flag arm is attached to an end plate, a first end plate being further attached to a pivoting means and a second end plate being further attached to a locking tube into which a locking pin is inserted, the roller switch capable of pivoting about the first end plate when the locking pin is removed from the tube.

7. A roller switch in accordance with claim 1 wherein the flag arms each have a horizontal leg and a vertical leg.

8. A roller switch comprising a roller, a pair of flag arms, and a photoelectric detector, the roller is mounted on a first shaft that extends between the pair of flag arms and a second shaft extends between the pair of flag arms, the second shaft being adjacent to the roller, wherein vertical movement of the roller causes the pair of flag arms to pivot about the second shaft, and vertical movement of one of the pair of flag arms causes the photoelectric detector to send a signal.

9. A roller switch in accordance with claim 8, the switch further comprising a tube mounted on the second shaft and extends between the pair of flag arms.

10. A roller switch in accordance with claim 8, the switch further comprising a support beam parallel to the first and second shafts, wherein the photoelectric detector can be mounted on either end of the beam.

11. A roller switch in accordance with claim 8, wherein the flag arms which have a horizontal leg and a vertical leg.

* * * * *